US011408081B2

(12) United States Patent
Thomassen et al.

(10) Patent No.: US 11,408,081 B2
(45) Date of Patent: Aug. 9, 2022

(54) METHOD FOR PRODUCING HYDROGEN IN A PEM WATER ELECTROLYSER SYSTEM, PEM WATER ELECTROLYSER CELL, STACK AND SYSTEM

(71) Applicant: HYSTAR AS, Oslo (NO)

(72) Inventors: Magnus S. Thomassen, Oslo (NO); Alejandro Oyarce Barnett, Trondheim (NO)

(73) Assignee: HYSTAR AS, Oslo (NO)

( * ) Notice: Subject to any disclaimer, the term of this patent is extended or adjusted under 35 U.S.C. 154(b) by 246 days.

(21) Appl. No.: 16/628,053

(22) PCT Filed: Jul. 2, 2018

(86) PCT No.: PCT/NO2018/050174
§ 371 (c)(1),
(2) Date: Jan. 2, 2020

(87) PCT Pub. No.: WO2019/009732
PCT Pub. Date: Jan. 10, 2019

(65) Prior Publication Data
US 2021/0147986 A1    May 20, 2021

(30) Foreign Application Priority Data
Jul. 3, 2017 (NO) .................................. 20171090

(51) Int. Cl.
*C25B 1/04*    (2021.01)
*C25B 9/23*    (2021.01)
(Continued)

(52) U.S. Cl.
CPC ................. *C25B 1/04* (2013.01); *C25B 1/50* (2021.01); *C25B 9/23* (2021.01); *C25B 9/65* (2021.01);
(Continued)

(58) Field of Classification Search
CPC ........... C25B 13/02; C25B 15/08; C25B 9/23; C25B 1/04
See application file for complete search history.

(56) References Cited

U.S. PATENT DOCUMENTS 5,350,496 A * 9/1994 Smith ...................... C25B 9/23
204/266
6,562,446 B1    5/2003 Totsuka
(Continued)

FOREIGN PATENT DOCUMENTS

CN    101163822    4/2008
CN    103732799    4/2014
(Continued)

OTHER PUBLICATIONS

US 5,622,609 A, 04/1997, Reichert et al. (withdrawn)
(Continued)

*Primary Examiner* — Brian W Cohen
(74) *Attorney, Agent, or Firm* — Wenderoth, Lind & Ponack, L.L.P.

(57) ABSTRACT

The present invention relates to a method for producing hydrogen in a polymer electrolyte membrane (PEM) water electrolyser cell. A direct electric current is applied to the water electrolyser cell. Water molecules are allowed to diffuse from a cathode compartment through a polymer electrolyte membrane into an anode compartment, to oxidize water molecules at an anode catalyst layer into protons, oxygen and electrons. The protons are allowed to migrate through a polymer electrolyte membrane into the cathode compartment and the protons are reduced at a cathode catalyst layer to produce hydrogen. The cell is supplied with water to the cathode compartment, and humidified air is supplied to the anode compartment. The invention also relates to a polymer electrolyte membrane (PEM) water electrolyser cell, a polymer electrolyte membrane (PEM)
(Continued)

water electrolyser stack and a polymer electrolyte membrane (PEM) water electrolyser system.

5 Claims, 3 Drawing Sheets

(51) Int. Cl.
*C25B 15/08* (2006.01)
*C25B 9/77* (2021.01)
*C25B 9/75* (2021.01)
*C25B 1/50* (2021.01)
*C25B 9/65* (2021.01)

(52) U.S. Cl.
CPC ............... *C25B 9/75* (2021.01); *C25B 9/77* (2021.01); *C25B 15/08* (2013.01)

(56) References Cited

U.S. PATENT DOCUMENTS

| | | | |
|---|---|---|---|
| 2007/0227900 A1* | 10/2007 | Benicewicz | H01M 8/1067 205/765 |
| 2009/0008261 A1 | 1/2009 | Kotzeva et al. | |
| 2011/0198232 A1 | 8/2011 | Cipollini et al. | |
| 2013/0092549 A1* | 4/2013 | Spurgeon | C25B 9/73 204/263 |
| 2014/0116877 A1 | 5/2014 | Guillet et al. | |
| 2017/0101717 A1 | 4/2017 | Sone et al. | |
| 2017/0321329 A1 | 11/2017 | Spurgeon | |
| 2018/0209051 A1* | 7/2018 | Baker | C25B 1/04 |
| 2018/0371630 A1* | 12/2018 | Swiegers | C25B 11/091 |

FOREIGN PATENT DOCUMENTS

| | | |
|---|---|---|
| JP | 03-182052 | 8/1991 |
| JP | 11-171504 | 6/1999 |
| JP | 2017-087168 | 5/2017 |
| KR | 10-2009-059214 | 6/2009 |
| WO | 03/064319 | 8/2003 |
| WO | 2008/138048 | 11/2008 |
| WO | 2009/072838 | 6/2009 |
| WO | 2017/081893 | 5/2017 |

OTHER PUBLICATIONS

U.S. Appl. No. 62/450,841; Provisional Application filed Jan. 26, 2017. (Year: 2017).*
International Search Report (ISR) dated Feb. 20, 2019 in International (PCT) Application No. PCT/NO2018/050174.
International Preliminary Report on Patentability dated Sep. 18, 2019 in International (PCT) Application No. PCT/NO2018/050174.
Norwegian Search Report dated Jan. 22, 2018 in Norwegian priority application No. 20171090.
S. Sawada et al., "Solid polymer electrolyte water electrolysis systems for hydrogen production based on our newly developed membranes, Part I: Analysis of voltage—current characteristics", Progress in Nuclear Energy, vol. 50, No. 2, pp. 443-448, Dec. 21, 2007.
Maximilian Schalenbach et al., "Pressurized PEM water electrolysis: Efficiency and gas crossover", International Journal of Hydrogen Energy, vol. 38, No. 35, pp. 14921-14933, Oct. 10, 2013.
Seung-Gon Kim et al., "A review on experimental evaluation of water management in a polymer electrolyte fuel cell using X-ray imaging technique", Journal of Power Sources, vol. 230, No. 5, pp. 101-108, Jan. 5, 2013.
Office Action dated Aug. 26, 2021, in corresponding Chinese Patent Application No. 201880044556.7, with English translation.

* cited by examiner

Figure 1
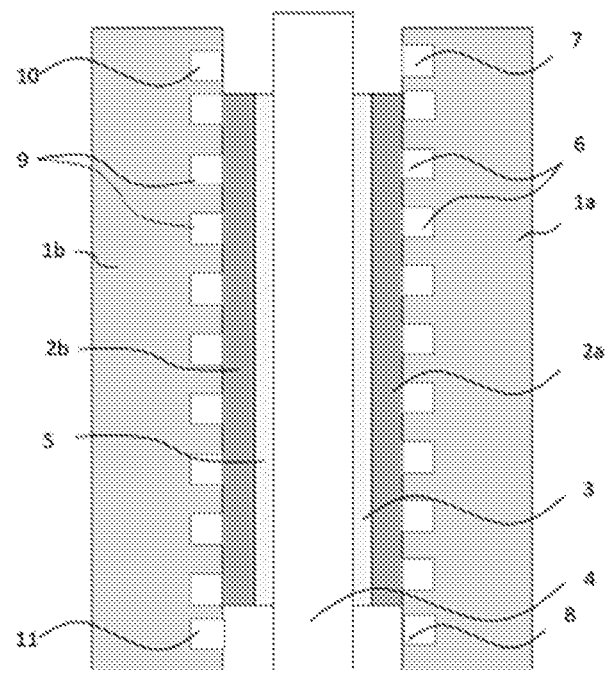
Figure 2     State of the art
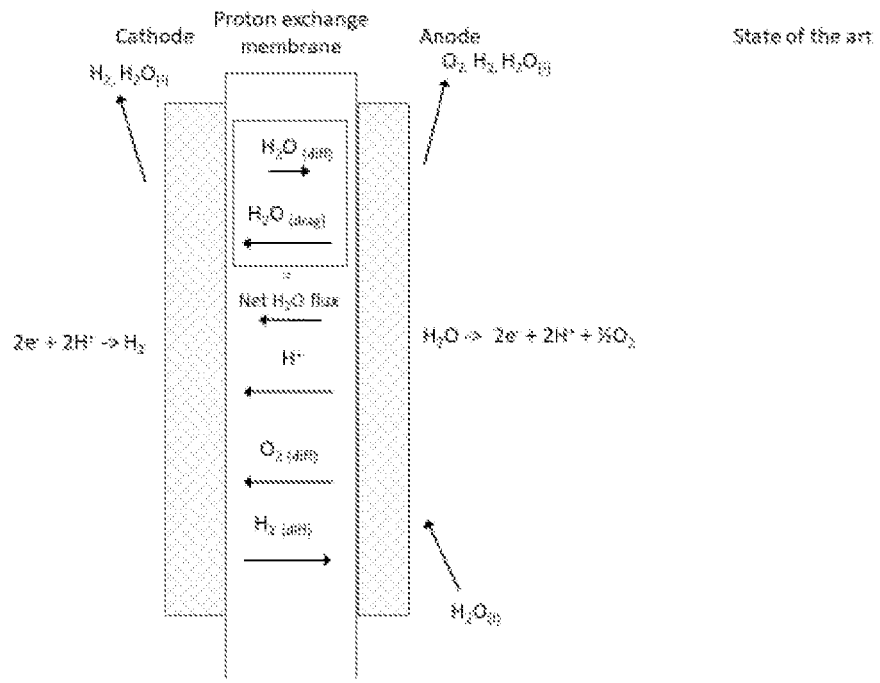

12 Blower/compressor
13 Air humidifier
14 PEM electrolyser stack
15 Hydrogen/water separator
16 Deoxidiser/dryer
17 Circulation pump
18 Heat exchanger
19 Water purification

METHOD FOR PRODUCING HYDROGEN IN A PEM WATER ELECTROLYSER SYSTEM, PEM WATER ELECTROLYSER CELL, STACK AND SYSTEM

TECHNICAL FIELD

The invention relates to a method for producing hydrogen using a PEM electrolyser system and relates to a polymer electrolyte membrane (PEM) water electrolyser system. More specifically, the invention relates to a PEM water electrolysis cell and stack of cells and the operation thereof.

BACKGROUND/PRIOR ART

A water electrolysis cell is an electrochemical device that dissociates water to produce hydrogen and oxygen gases. An electrolysis cell includes a cathode, an anode and an electrolyte. The electrolyte is positioned between the cathode and the anode and transports ions between the electrodes while preventing the transport of electrons. One electrolyte alternative is a polymer electrolyte membrane (PEM), also called a proton exchange membrane. During operation of an electrolyser cell, water is oxidized to oxygen gas, protons and electrons at the anode. The protons migrate from the anode to the cathode due to an applied electric field across the polymer electrolyte membrane. At the cathode, the protons combine with electrons transferred through an external circuit to produce hydrogen gas. FIG. 2 shows a schematic diagram of a membrane electrode assembly (MEA) of a PEM water electrolyser cell according to the state of the art and the main transport phenomena and reactions occurring.

The electrolysis cell consumes water at the anode side and this water must continuously be supplied to the anode. The water can either be supplied directly to the anode (as shown in FIG. 2) or be supplied to the cathode and transported through the polymer electrolyte membrane to the anode. The rate of consumption of water, and thus, the rate of hydrogen and oxygen generation, is governed by Faraday's law in that an increase of the current passed through the cell will result in a corresponding increase in the generation of gas and consumption of water.

In addition to the water transport, oxygen ($O_{2\ (diff)}$) and hydrogen ($H_{2\ (diff)}$) are transported through the membrane through a diffusion/convection mechanism due to the partial pressure gradient of the gases across the membrane. This gas flux across the membrane and the consequent mixing of hydrogen in oxygen on the anode and oxygen in hydrogen on the cathode is in state of the art PEM water electrolysers one of the main design and operational constraints: As only a small amount of hydrogen in oxygen in the anode is needed to form flammable and/or explosive gas mixtures, the hydrogen transported through the membrane will exceed this level if the oxygen production on the anode is too low (low current densities) or the transport of hydrogen is too high (thin membrane and/or high permeability).

This hydrogen crossover problem is in state of the art PEM water electrolysers remedied by using a thick membrane (above 125 μm), preferably made of perfluorosulfonic acid (PSFA) polymers, such as Nafion® or Aquvion®, to effectively reduce the hydrogen diffusion through the membrane. A hydrogen/oxygen recombination catalyst such as platinum or palladium may be introduced into the membrane, acting as reaction sites for local recombination of oxygen and hydrogen to water, preventing the diffusing gases to reach the other electrode compartment and entering the gas phase. However, to have the necessary amount of recombination catalyst and time for the recombination reaction to take place, it is still necessary to have a significant thickness of the membrane. Thus, state of the art water electrolysers use polymer electrolyte membranes with thicknesses of 125 microns (Nafion® 115 or equivalent) or higher.

The use of such thick membranes introduces a significant ohmic resistance and consequently a lower efficiency of the electrolyser, especially at current densities above 1 $Acm^{-2}$.

Today, water electrolysers are operated with a stack efficiency around 65-70% (higher heating value HHV) which results in a demand of about 55 kWh of electricity for 1 kg $H_2$. Of the 55 kWh, about 50 kWh is used by the electrolysis process and 5 kWh by the balance of plant (circulation and feed water pump, heat exchanger, ion exchanger, gas/water separators, valves and sensors). In most water electrolyser systems, the cost of electricity can amount to up to 80% of the cost of the produced hydrogen and an increase in the efficiency of the water electrolyser stack will improve both the overall primary electrical energy consumption and the total cost of hydrogen.

Current PEM electrolysers are limited in efficiency by mainly two factors:
1. The overpotential on the anode
2. The ohmic resistance in the polymer membrane.

It is an object of the present invention to provide an improved method and system for the production of hydrogen by water electrolysis. It is further an aim to reduce the energy consumption and consequently reduce the cost of hydrogen produced. Another object of the present invention is to avoid the formation of flammable or explosive mixtures of oxygen and hydrogen in the electrolyser.

SHORT SUMMARY OF THE INVENTION

In a first aspect of the invention, a method for producing hydrogen in a polymer electrolyte membrane (PEM) water electrolyser cell is provided. The method comprises applying a direct electric current to the water electrolyser cell, allowing water molecules from a cathode compartment to diffuse through a polymer electrolyte membrane into an anode compartment, oxidizing water molecules at an anode catalyst layer into protons, oxygen and electrons, allowing the protons to migrate through a polymer electrolyte membrane into the cathode compartment, reducing the protons at a cathode catalyst layer to produce hydrogen, supplying water to the cathode compartment and supplying humidified air to the anode compartment.

In one embodiment of the invention, the humidified air supplied to the anode compartment has a relative humidity (RH) above 75% RH. The humidified air may also be saturated with water. Optionally, supersaturated air is used. The humidified air may be supplied to the anode by use of an air humidifier pump/blower, and distributed through flow distribution manifolds and via flow patterns on the anode bi-polar plate for optimal gas and water distribution along the active area of the anode.

During operation, the pressure on the cathode side of the electrolyser cell is preferably controlled to be higher than the pressure on the anode side. Preferably, the pressure on the cathode side is between 0.5 bar to 35 bar higher than the pressure in the anode compartment. During operation, the anode compartment is usually operated at a pressure slightly above ambient pressure.

In a second aspect of the invention, a polymer electrolyte membrane (PEM) water electrolyser cell for hydrogen production is provided. The PEM water electrolyser cell comprises an anode compartment comprising an anode bi-polar plate, an anode metallic porous transport layer, and an anode catalyst layer, a cathode compartment comprising a cathode bi-polar plate, a cathode metallic porous transport layer, and a cathode catalyst layer, the anode catalyst layer and the cathode catalyst layer are coated on either side of a polymer exchange membrane, wherein the cathode compartment is configured to be supplied with ion exchanged water through a first set of inlet and outlet flow distribution manifolds and the cathode bi-polar plate is designed with a first flow field pattern, and the anode compartment is configured to be supplied with humidified air through a second set of inlet and outlet flow distribution manifolds and the anode bi-polar plate is designed with a second flow field pattern.

The anode catalyst layer and the cathode catalyst layer may comprise catalysts in powder form.

The temperature of the supplied air and the relative humidity values are usually at nominal operating temperature of the electrolyser of 50 to 90° C.

The polymer electrolyte membrane may have a thickness below 50 microns, preferably in the range of 5 to 49 microns, and most preferred from 10 to 35 microns.

In a third aspect of the invention a PEM water electrolyser stack comprising a plurality of polymer electrolyte membrane water electrolyser cells according to the invention, connected in series, is provided In a fourth aspect of the invention, a PEM water electrolyser system is provided. The system comprises the PEM electrolyser stack according to the invention together with a water and oxygen management system, a hydrogen gas management system, a water input system, mounting and packaging cabinetry subsystem, a ventilation system, power electronics and power supply, system controls and instrumentation, and a humidified air supply and humidification system.

FIGURES

FIG. 1 is a schematic diagram of an electrolyser cell constructed to be operated with supply of humidified air on the anode and liquid water on the cathode.

FIG. 2 is a schematic diagram of a membrane electrode assembly, MEA, according to the state of the art.

DETAILED DESCRIPTION

Figure 3:
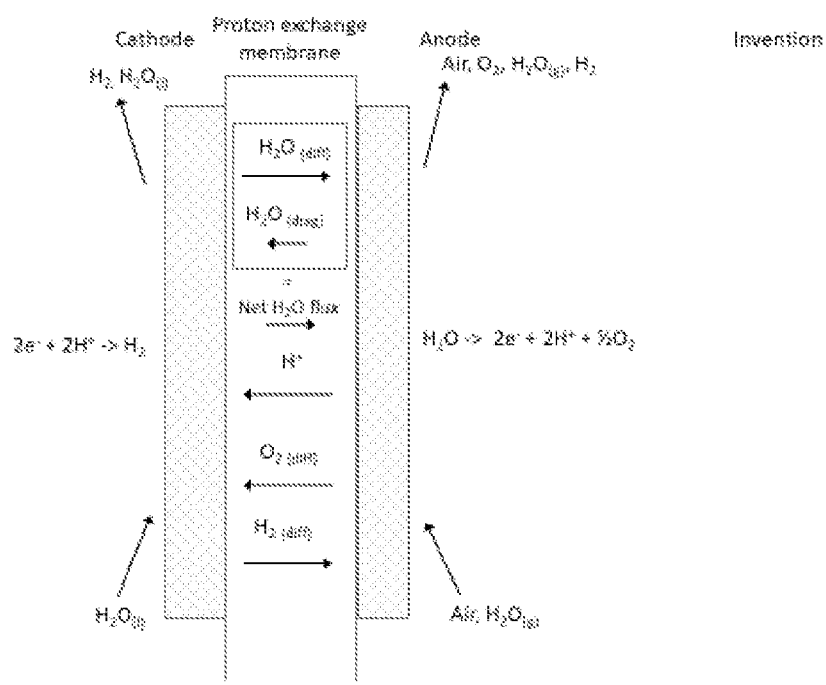
FIG. 3 is a schematic diagram of a membrane electrode assembly, MEA, according to the invention.

The objects and features of the invention can be better understood with reference to the drawings described below.

FIG. 1 is a schematic diagram of an electrolyser cell constructed to be operated with supply of humidified air on the anode and liquid water on the cathode.

The electrolyser cell comprises an anode compartment having an anode bi-polar plate (1a), an anode metallic porous transport layer (2a), and an anode catalyst layer (3) coated on top of a thin polymer electrolyte membrane (4). The cathode compartment comprises a cathode catalyst layer (5) coated on top of the polymer electrolyte membrane (4), a cathode metallic porous transport layer (2b) and a cathode metallic bi-polar plate (1b). The anode bi-polar plate (1a) is made of a metallic material with high corrosion resistance and high electrical conductivity. In addition, the anode bi-polar plate (1a) is designed with a flow field pattern (6) and corresponding inlet (7) and outlet (8) flow distribution manifolds for optimal gas and water distribution along the active area of the electrolyser. Both the anode bi-polar plate (1a) and the anode metallic porous transport layer (2a) are optimised to minimise electrical contact resistances in the electrolyser. The anode metallic porous transport layer (2a) is made of a highly corrosion resistant and highly electronic conductive porous material that enables the diffusion of humidified air into the anode catalyst layer (3). The anode catalysts layer (3) comprises a catalyst that is highly efficient for the oxygen evolution reaction and a proton conductive polymer that allows for the migration of protons out and water into the anode catalyst layer (3). The cathode metallic bi-polar plate (1b) is also made of a metallic material with high corrosion resistance and high electrical conductivity. The cathode bi-polar plate (1b) is designed with a flow field pattern (9), but not necessarily the same as the flow field pattern (6) of the anode bi-polar plate (1a), a corresponding inlet (10) and outlet (11) flow distribution manifolds for optimal water and gas distribution along the active area of the electrolyser device, but not necessarily the same as (7) and (8) on the anode side. The cathode metallic porous transport layer (2b) is made of a highly corrosion resistant and highly electronic conductive porous material that enables the transport of water and hydrogen in and out of the cathode catalyst layer (5). The cathode catalysts layer (5) comprises a catalyst that is highly efficient for the hydrogen evolution reaction and a proton conductive polymer that allows for the migration of protons in and water out of the cathode catalysts layer (5).

FIG. 3 shows a schematic diagram of a membrane electrode assembly (MEA) of the PEM water electrolyser cell according to the invention and the main transport phenomena and reactions occurring.

During operation, ion exchanged water ($H_2O(l)$) is introduced to the cathode compartment of the cell through a stack inlet port, an internal manifold and a flow field pattern on the cathode bi-polar plate. Humidified air is supplied to the anode compartment through an anode inlet port, an internal manifold and a flow field pattern on the anode bi-polar plate. A portion of the water on the cathode is absorbed by the polymer electrolyte membrane and moves to the anode through a combined diffusion/convection mechanism ($H_2O$ (diff)). Water reacts on the anode and is converted to oxygen gas, protons and electrons according to equation (1):

$$H_2O \rightarrow 2e^- + 2H^+ + \tfrac{1}{2}O_2 \qquad (1)$$

The protons migrate through the polymer electrolyte membrane from the anode side to the cathode side and by a phenomenon known as electroosmotic drag, carrying a significant portion of liquid water ($H_2O(drag)$) from the anode side to the cathode side of the membrane. At the cathode, the protons combine with electrons transferred through an external circuit to produce hydrogen gas according to equation (2).

$$2e^- + 2H^+ \rightarrow H_2 \qquad (2)$$

Any excess water in the anode compartment exits the cell together with air, produced oxygen gas, water vapour (($H_2O$ (g)) and small amounts of hydrogen gas. Hydrogen gas produced on the cathode side exits the cell together with the excess water and traces of oxygen.

The rate of oxygen generation at the anode and the rate of hydrogen generation at the cathode in the electrolysis cell are governed by Faraday's law in that an increase in the applied cell current will increase the rate of consumption of water at the anode, and thus, the rates of gas generation on both the anode and cathode.

In order to maintain an increased hydrogen generation at a given electrode area and stack size, the anode must be supplied with sufficient water.

Continuous operation of the electrolysis cell requires water transport from cathode to anode where it is consumed in the oxygen evolution reaction. In addition to this consumption, other mechanisms also remove water from the anode. Firstly, an effect known as electroosmotic drag depletes the anode of water, as the protons moving through the membrane will drag an amount of water molecules with them. In Nafion® membranes for example, the electroosmotic drag can be up to about three molecules of water per proton.

The anode gas phase in the cell will be undersaturated with water vapour due to the additional oxygen gas produced at the anode. Liquid water in the anode will therefore evaporate and leave the anode with the exiting gas and be replenished by water from the membrane.

The diffusion of water through the membrane is proportional to the gradient of the activity of water in the membrane and the diffusion coefficient of water in the membrane, also known as Ficks law.

The gradient of the activity in the membrane is inversely proportional to the thickness of the membrane in that a decrease of the membrane thickness increases the activity gradient.

In the present invention, the thickness of the PEM membrane may be less than 50 microns, preferably from 5 to 49 microns, even more preferred in the range 10 to 35 microns. Using a thin membrane as described above in the electrolysis cell, increases the water transport from the cathode to the anode, resulting in a larger limiting current density, and thus, an increased hydrogen and oxygen gas generation at a given cell and stack size.

The activity of water on the cathode is proportional to the pressure on the cathode. In one embodiment, the pressure of the cathode of the electrolyser cell during operation is controlled to be higher than the pressure on the anode. This pressure differential will "push" water from the cathode to the anode, and thus, improves the water transport from cathode to anode and results in an increased gas production rate at the same electrode size. The pressure on the anode is typically slightly above ambient pressure in order to overcome the pressure drop of flowing humidified air through the anode compartment. In one embodiment, the pressure difference between cathode and anode is between 0.5 bar and 35 bar, in another embodiment the pressure difference is between 1 bar and 20 bar.

The use of a thin membrane as described above, which is significantly thinner than the membranes used in state of the art electrolysis cells, will reduce the ohmic resistance of the electrolysis cell and thereby reduce the energy consumption of the process as much as 15-20%, and thus, reduce the need for external cooling of the electrolysis cell. A thinner membrane will also increase the flux of hydrogen from the cathode to the anode and oxygen from anode to cathode. In a conventional electrolysis cell with only water feed on the anode, the increased hydrogen flux will lead to an increased risk of formation of explosive or flammable gas mixtures in the anode compartment over a wider operating range of the electrolysis cell. This invention is mitigating this risk by combining the use of a thin membrane with supply of humidified air to the anode. The supply of humidified air to the anode will effectively dilute the hydrogen transported from the cathode through the membrane to levels far below the lower explosion limit (LEL) of hydrogen-air mixtures of about 4 mol-%, and thus, removing the risk of the formation of flammable or explosive gas mixtures in the complete operating range of the electrolysis cell.

Operation of the electrolyser cell may cause degradation of the polymer electrolyte membrane for example by a free radical attack process. This degradation process is typically highest in the membrane region close to the cathode due to formation of hydrogen peroxide and free radicals as biproducts of the reduction of oxygen at the cathode. The rate of formation of free radicals, and consequently, the concentration of these in the membrane is directly related to the flux of oxygen through the membrane from the anode to the cathode. This flux is a combination of diffusion in the polymer phase and diffusion/convection in the water phase in the membrane. The diffusion rate is generally directly proportional to the partial pressure of oxygen in the anode ($pO_2$) and the convection rate is proportional to the water flux through the membrane.

In one embodiment, as the electrolysis cell is fed with humidified air on the anode, the combination of nitrogen and water vapour in the air provides a much lower $pO_2$ than in a conventional PEM electrolysis cell. In addition, the net water flux is from the cathode to the anode as opposed to a conventional PEM electrolysis cell where the net $H_2O$ flux is from the anode to the cathode (see FIGS. 2 and 3). Thus, an electrolyser cell operated with humidified air feed on the anode and water feed on the cathode will have a significantly lower formation of free radicals and a lower membrane degradation rate than conventional PEM electrolysers.

Figure 4:
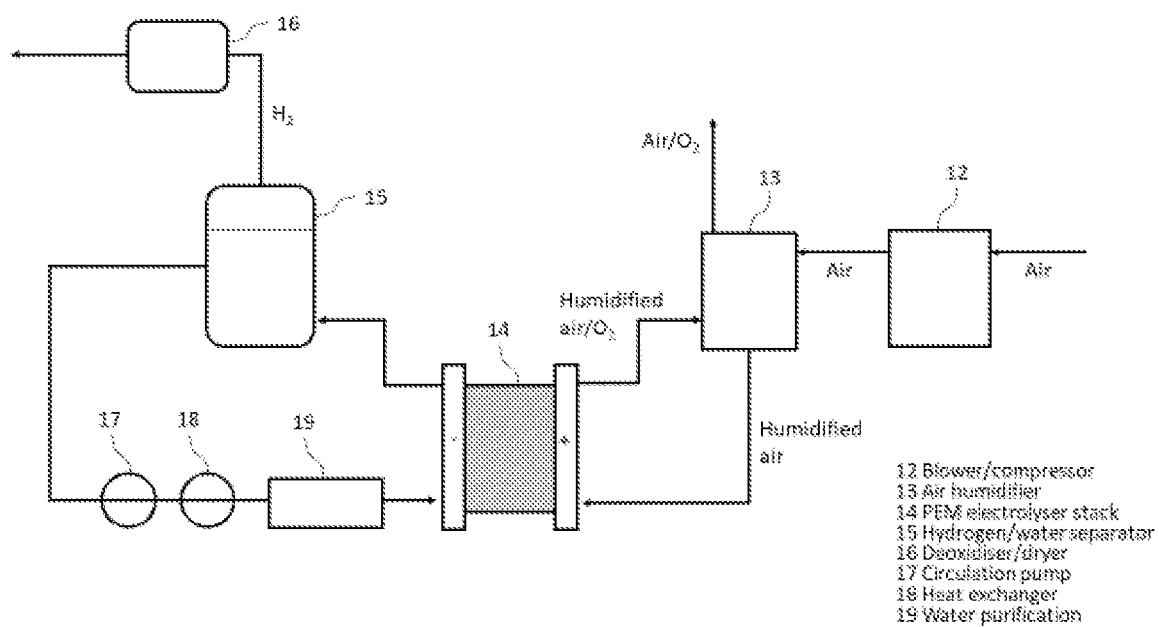
FIG. 4 is a schematic diagram of a PEM water electrolyser system according to the invention.

FIG. 4 shows a schematic diagram of a PEM water electrolyser system according to the present invention. In this system, air is supplied via a blower or compressor (12) to an air humidifier (13) configured to achieve a controlled humidification level of the air supplied to the anode side of the cells in a PEM electrolyser stack (14). The air humidifier can be selected from a range of alternatives, such as an enthalpy wheel, membrane humidifier, water atomizer, spray tower or bubble humidifier.

The electrolyser stack (14) is configured to supply the humidified air to each electrolyser cell so that the humidified air is distributed evenly over the surface of the anode electrode so as to dilute hydrogen gas permeating from the cathode to a level below 1 volume %. In addition, the electrolyser stack is configured to supply liquid water to the cathode compartment of each electrolyser cell. This combination is vital to secure the necessary water needed for the oxygen evolution reaction on the anode and to ensure a high water content in the membrane to retain a high proton conductivity. Ion exchanged water is supplied from a water purification device (19). Hydrogen produced exits the PEM water electrolyser stack (14) together with water. Hydrogen and water are separated in a hydrogen/water separator (15). The hydrogen flows through a deoxidizer/dryer (16). The separated water is recycled to the water purification unit (19) and into the PEM water electrolyser stack (14). A circulation pump (17) and a heat exchanger (18) may be included in the circulation line.

Experiment

Figure 5:
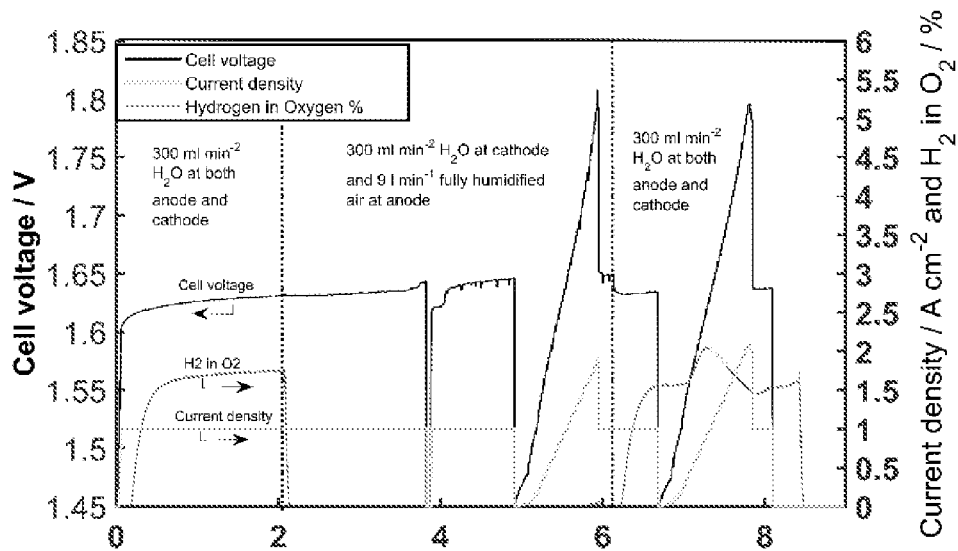
FIG. 5 is a diagram showing cell voltage, current density and anode side gas composition during an electrolyser test.

An experiment was performed using a MEA based on a Nafion® 212 membrane (50 micron thickness) and mounted in a 25 $cm^2$ electrolyser test cell. The test cell was connected to a PEM electrolyser test station from Greenlight Technologies. During the first two hours of the experiment, the cell was operated at 60° C. in conventional mode at 1 Acm$^{-2}$ with water circulation on the anode and cathode. The concentration of hydrogen in oxygen was continuously monitored and showed a steady state value of about 2 vol % at the anode side. The concentration of hydrogen in oxygen as a function of time is shown in FIG. 5. After two hours, the operation was changed and 9 l min$^{-1}$ of humidified air (100% RH at 60° C.) was supplied to the anode while liquid water was supplied to the cathode. The hydrogen concentration in the outgoing gas from the anode immediately drops to undetectable (below 0.1%) levels while the cell voltage and current of the electrolyser is constant.

After 5 hours, the effect of current density was investigated. These results are also shown in FIG. 5. The current density was varied from 0.01 to 2 Acm$^{-2}$ and no detectable amounts of hydrogen in the outgoing anode gas was detected. As a comparison, the cell was turned back to conventional operation with water on both anode and cathode and the hydrogen concentration quickly increased to about 2 vol % or higher (at low current density).

After eight hours of operation, the cell was shut down and the experiment ended. This experiment clearly demonstrates that a PEM electrolyser with a thin membrane can operate with only humidified air supplied to the anode inlet with the same performance as a cell supplied with liquid water on the anode, but with significantly lower hydrogen concentrations in the produced gas on the anode. It is possible to maintain a high current density when water is supplied to the cathode, and humidified air is supplied to the anode, and the hydrogen concentration is low on the anode side. The inventive method enables secure operation combined with high efficiency, and thus, lower operational and equipment costs.

Figure 6:
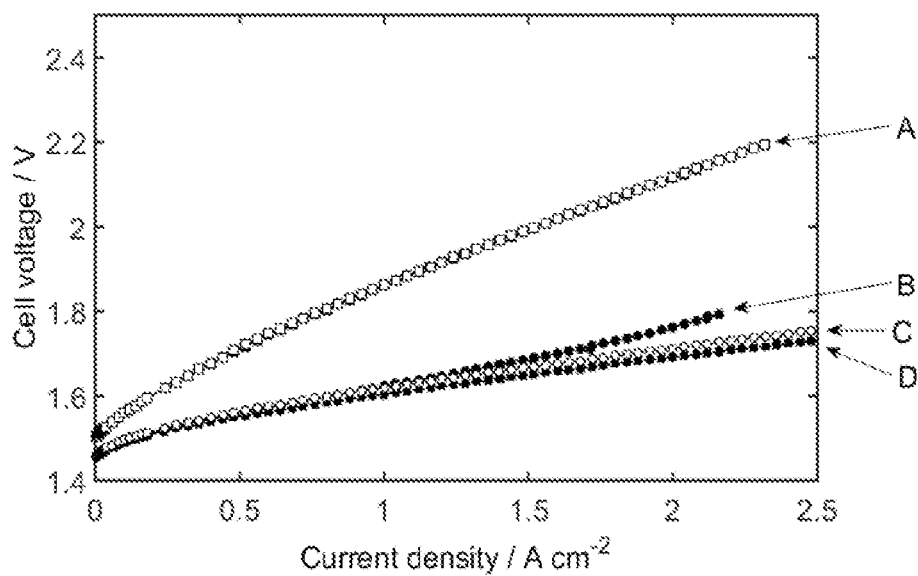
FIG. 6 is a diagram showing cell voltage at different operating conditions (proportional to energy consumption).

FIG. 6 shows the difference in energy consumption between the use of a thick membrane and a thin membrane at different operating conditions. The lines A-D show the effect of different conditions:

A: Thick membrane (125 microns), commercial water electrolyser equivalent. Water on cathode and anode. Inefficient, but SAFE operation (low H$_2$ concentration at anode)

B: Thin membrane (27.5 microns). Water on cathode and anode: Very efficient, but UNSAFE operation (very high 3.5 vol % H$_2$ concentration at anode due to thin membrane)

C: Thin membrane (30 microns). Water on cathode and humidified air on anode: Efficient and SAFE operation (low H$_2$ concentration (not detectable) at anode due to dilution. Voltage increase at high current due to drier anode)

D: Thin membrane (30 microns). Water with higher pressure on cathode and humidified air on anode: Very efficient and SAFE operation (Low H$_2$ concentration (not detectable) due to dilution and improved efficiency due to more water pushed from cathode to anode by higher cathode pressure)

When using water on both the anode and the cathode (state of the art) and a thick membrane, line A, safe operation is obtained, but the process is not very efficient. Using a thin membrane and water on both cathode and anode side, line B, is very efficient, but not safe, as the concentration of hydrogen increases to more than 3 vol % H$_2$ in O$_2$. When using the thin membrane, the energy consumption decreases with around 20%.

By operating the cell according to the invention (lines C and D), the concentration of H$_2$ is maintained at a low level, i.e. below 0.5%, and the cell may be operated with a higher current density and lower energy consumption compared with the state of the art.

The invention claimed is:

1. A method for producing hydrogen in a polymer electrolyte membrane (PEM) water electrolyser cell, the method comprising:
   applying a direct electric current to the water electrolyser cell;
   allowing water molecules from a cathode compartment to diffuse through a polymer electrolyte membrane into an anode compartment;
   oxidizing water molecules at an anode catalyst layer into protons, oxygen and electrons;
   allowing the protons to migrate through a polymer electrolyte membrane into the cathode compartment; the polymer electrolyte membrane having a thickness below 50 µm; reducing the protons at a cathode catalyst layer to produce hydrogen; supplying liquid water to the cathode compartment, and
   supplying humidified air to the anode compartment;
   wherein the anode compartment during operation is operated at a pressure slightly above ambient pressure and the cathode compartment is operated at a pressure between 0.5 bar to 35 bar higher than the pressure of the anode compartment.

2. The method of claim 1, wherein the humidified air has a relative humidity (RH) above 75% RH at a nominal operating temperature of the electrolyser.

3. The method of claim 1, wherein the humidified air is supersaturated air.

4. The method of claim 1, wherein the humidified air is supplied through flow distribution manifold and via flow field patterns on an anode bi-polar plate.

5. The method of claim 1, wherein the polymer electrolyte membrane has a thickness in the range of 5 to 49 µm.

* * * * *